United States Patent [19]

Farris

[11] Patent Number: 4,826,209
[45] Date of Patent: May 2, 1989

[54] VEHICLE COLLISION SAFETY SYSTEM

[76] Inventor: Edward T. Farris, 4715 Greenville Ave., Dallas, Tex. 75206

[21] Appl. No.: 100,130

[22] Filed: Sep. 23, 1987

[51] Int. Cl.$^4$ .............................................. B60R 21/02
[52] U.S. Cl. .................................... 280/784; 180/274; 296/35.2
[58] Field of Search ............... 280/784, 781; 180/274; 296/35.2

[56] References Cited

U.S. PATENT DOCUMENTS

| | | | |
|---|---|---|---|
| 1,138,309 | 5/1915 | Pixley | 105/6 |
| 1,234,809 | 7/1917 | Schohaus | 105/5 |
| 3,162,479 | 12/1964 | Hewitt | 296/35 |
| 3,383,077 | 5/1968 | Noviello, Jr. | 244/113 |
| 3,479,080 | 11/1969 | Hilfiker | 296/35 |
| 3,743,347 | 7/1973 | Shaw | 296/35 R |
| 3,831,998 | 8/1974 | Hewitt | 296/35 R |
| 3,837,422 | 9/1974 | Schlanger | 180/91 |
| 3,909,058 | 9/1975 | Krämer et al. | 296/28 R |

FOREIGN PATENT DOCUMENTS

| | | | |
|---|---|---|---|
| 2225481 | 1/1973 | Fed. Rep. of Germany | 280/784 |
| 1063666 | 12/1983 | U.S.S.R. | 280/784 |
| 1063665 | 12/1983 | U.S.S.R. | 280/784 |
| 1164107 | 6/1985 | U.S.S.R. | 280/784 |

*Primary Examiner*—Kenneth R. Rice
*Attorney, Agent, or Firm*—Richards, Harris, Medlock & Andrews

[57] ABSTRACT

A safety vehicle (10) for passengers includes a horizontally disposed chassis (16) having a front (16a) and rear (16b) portion. The vehicle body (14) is disposed on the chassis (16) and includes a passenger section (20) disposed intermediate the front and rear portions of the chassis (16). The chassis (16) includes three lever arms (44, 46, 48) pivotally interconnected. The first lever arm (44) is disposed adjacent the front portion of the chassis (16). A second lever arm (48) is disposed adjacent the passenger section (20). The third lever arm (46) is pivotally interconnected to the first and second lever arms, such that the first end of the third lever arm is pivotally connected adjacent to the second end of the first lever arm (44) at a first pivot point (60). The second end of the third lever arm (46) is pivotally connected adjacent to the first end of the second lever arm (48) at a second pivot point (62). Upon impact, the chassis (16) front portion (16a) rotates about the first pivot point (60) in a first direction of rotation (68) and the chassis rear portion (16b) rotates about the second pivot point (62) in a second direction of rotation (70) opposite to the first direction of rotation (68) of the chassis front portion (16a) thereby removing the passenger section (20) from the linear impact forces created by the collision and translating a portion of the linear deceleration motion of the vehicle (10) into rotational motion of the passenger section (20).

8 Claims, 4 Drawing Sheets

VEHICLE COLLISION SAFETY SYSTEM

TECHNICAL FIELD

This invention relates to safety construction and modification for vehicles, and more particularly to an improved vehicle chassis construction serving to minimize the transference of impact energy to the occupants of a vehicle upon occurrence of a collision.

BACKGROUND ART

With the increasing mortality rates of passengers in vehicles involved in collisions arising from the increased use of motor vehicles and the increased rate of speed at which they are operated, the problem of protecting the passenger in a vehicle has been a major concern and has been addressed in a variety of fashions. Recently, manufacturers have developed various safety devices which are designed to reduce injury to passengers ween the vehicle in which they are riding is involved in collision or impact. Such safety features have included padded dashboards, collapsible steering columns, seat belts and inflatable airbags.

However, the use of such safety devices have tended to reduce serious or fatal injuries to occupants where the collision or impact takes place only at reduced speeds. In instances of higher speed impact, these devices are ineffective to prevent serious injury. It has been demonstrated that collisions occur in less than 125 milliseconds and that the "G" forces are directly dependent upon the speed of the colliding objects and the speed or distance involved in the stop. Deceleration is defined as the rate of decrease of the speed of a moving body. When the force applied is equivalent to the weight of the moving body, this force is defined as a "G" force, being positive in acceleration and negative in deceleration.

Injuries are dependent upon the "G" forces sustained by the passengers. Deceleration and injury are functions of negative acceleration. At 60 miles per hour or 88 feet per second, a vehicle in collision with an immovable object may stop in three feet or less, which equates to an elapsed time of 34 milliseconds. Two automobiles each traveling at 30 miles per hour in a head-on collision would approximate the same speed of a 60 mile per hour collision resulting in "G" forces in the range of 240 or more "G's". If the time involved in the above described collision could be doubled which translates into an additional three feet of "stopping" space, the "G" forces are found to be divisible by four equalling 60 "G's". If this time is tripled or equivalent to nine feet, the "G" forces are divided by nine equalling 26.66 "G's". Therefore, the increased stopping distance or time involved is critical to injuries sustained by an occupant of a vehicle during a collision.

The examination of motor vehicles in head-on collisions with another vehicle or an immovable stationary object indicates that the front portion of the vehicle as far back as the firewall stops in four feet or less which, at 60 miles per hour occurs in about 45 milliseconds or less. The passengers in the front seat of the vehicle will decelerate within approximately four to seven feet or approximately 45 to 79 milliseconds and the passengers in the rear seat have approximately an additional three feet of travel for approximately 79 to 113 milliseconds before impact. Survivability can be equated with "G" forces. Animal and human experimentation has demonstrated that 40 "G's" can be sustained momentarily. Therefore, it is apparent that a "stretching" of time or distance is vehicle collision deceleration is all important to survivability and/or injury to vehicle occupants.

Passengers of vehicles also experience injuries during a collision due to contacting vehicle components such as the steering wheel, gear shift levers and pedals.

A need has thus arisen for a vehicle which allows for increased stopping distances and time for passengers within the vehicle to come to rest during a collision. Such a system must increase the linear deceleration of the passengers which would lessen the forces transmitted to the passengers. A need has further arisen for a vehicle for passengers in which the occupants are removed from a first line of deceleration and impact into a secondary line providing increased stopping distance or time for passengers within the vehicle to come to rest during a collision. A need has further arisen for a vehicle for passengers in which the occupants are removed from the first line of deceleration and impact into a secondary line and causing any impact to be borne by parts of the vehicle and passengers more capable of absorbing said impact forces with less injury. A need has further arisen for a vehicle in which components of a vehicle which may come in contact with a passenger during collision and cause injury are removed from the passenger compartment as the collision occurs and in advance of passenger contact and injury.

DISCLOSURE OF THE INVENTION

A safety vehicle for passengers includes a horizontally disposed chassis having a front and rear portion. The vehicle body is disposed on the chassis and includes a passenger section disposed intermediate the front and rear portions of the chassis. The chassis includes three lever arms pivotally interconnected. The first lever arm is disposed adjacent the front portion of the chassis. A second lever arm is disposed adjacent the passenger section. The third lever arm is pivotally interconnected to the first and second lever arms, such that the first end of the third lever arm is pivotally connected adjacent to the second end of the first lever arm at a first pivot point. The second end of the third lever arm is pivotally connected adjacent to the first end of the second lever arm at a second pivot point. Upon impact, the chassis front portion rotates about the first pivot point in a first direction of rotation and the chassis rear portion rotates about the second pivot point in a second direction of rotation opposite to the first direction of rotation of the chassis front portion thereby removing the passenger section from the linear impact forces created by the collision and translating a portion of the linear deceleration motion of the vehicle into rotational motion of the passenger section.

DESCRIPTION OF THE DRAWINGS

For a more complete understanding of the present invention and for further advantages thereof, reference is now made to the following Detailed Description taken in conjunction with the accompanying Drawings in which.

DETAILED DESCRIPTION

Figure 1A:
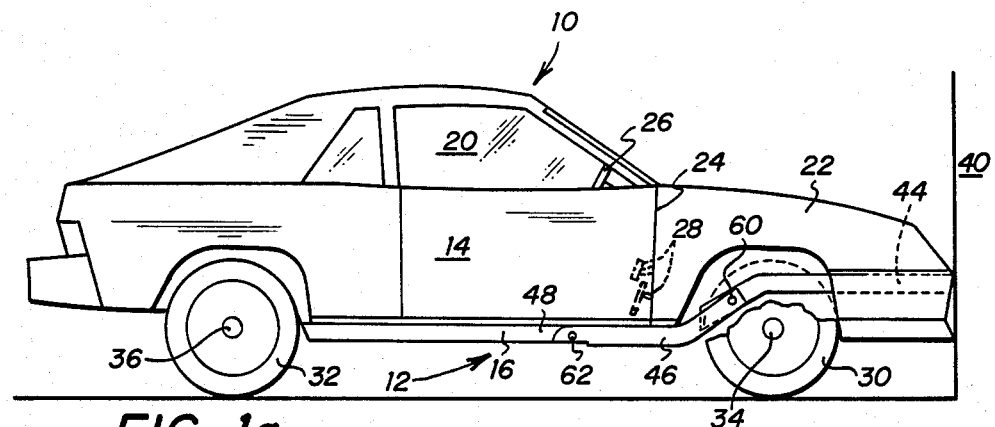
FIGS. 1a, 2a, 3a, 4a and 5a are diagrammatic side elevational views of a vehicle provided with the safety system of the present invention during various stages of a collision.

Referring to FIG. 1a, an automobile vehicle, generally identified by the numeral 10 including the present collision safety system, generally identified by the numeral 12 is illustrated. Vehicle 10 includes a body 14 mounted on a chassis, generally identified by the numeral 16. Body 14 includes a passenger section 20 and a front portion 22, typically housing an engine for vehicle 10. Passenger section 20 and front portion 22 of vehicle 10 are typically separated by a fire wall 24 which, for purposes of discussion herein will define a front and rear portion of chassis 16. The portion of chassis 16 lying adjacent front portion 22 of body 14 will be referred to as the front portion of chassis 16 and is identified by the reference numeral 16a. The portion of chassis 16 lying to the rear of vehicle 10 and behind fire wall 24 and below passenger section 20 will be referred to as the rear portion of chassis 16 and is identified by the reference numeral 16b. Disposed between front portion 22 and passenger section 20 of vehicle 10 are steering wheel 26 and pedals 28. Chassis 16 is supported by wheels 30 and 32 which rotate on axles 34 and 36, respectively.

FIG. 1a illustrates vehicle 10 at the moment of impact with a stationary object such as, for example, a wall 40. Wall 40 is shown for illustrative purposes only, it being understood that the present safety system 12 is utilized for protecting passengers of vehicle 10 in any type of collision including, for example, head-on automobile collisions.

Figure 1B:
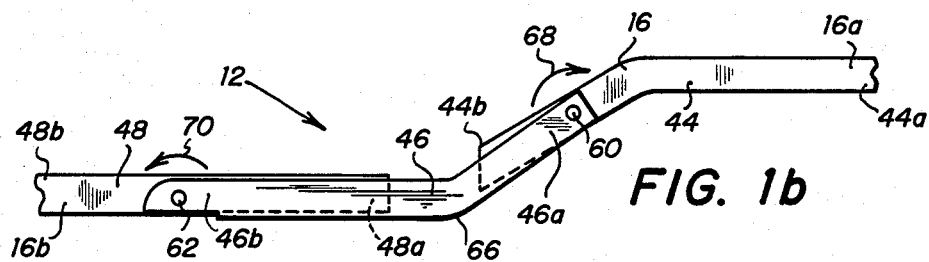
FIGS. 1b, 2b, 3b, 4b and 5b are schematic diagrams illustrating the position of the lever arms of the present invention corresponding to FIGS. 1a, 2a, 3a, 4a and 5a during various stages of a collision.
Figure 2A:
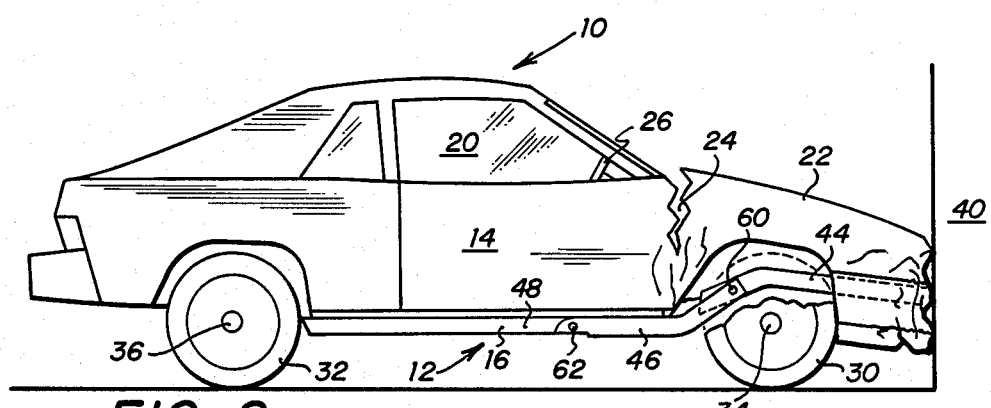
Figure 2B:
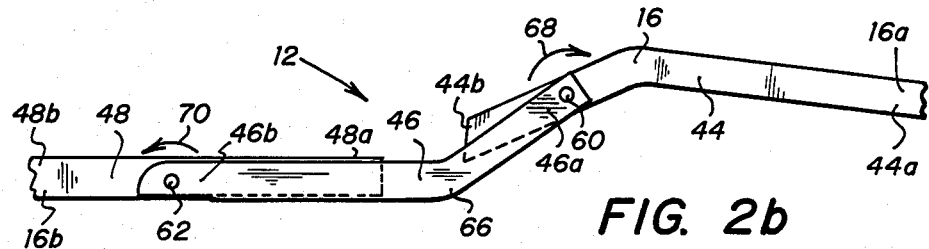

Referring specifically to FIG. 1b chassis 16 is composed of three lever arms 44, 46 and 48 having respective ends a and b. Lever arm 44 of chassis 16 is positioned adjacent to and is attached to front portion 22 of body 14 and above axle 34 (FIG. 1a). Lever arm 48 is generally disposed to the rear of fire wall 24 and is attached below passenger section 20 of vehicle 10. Lever arm 46 is pivotally interconnected to lever arms 44 and 48 and interconnects end 44b of lever arm 44 to end 48a of lever arm 48. End 46a of lever arm 46 is pivotally connected to lever arm 44 at pivot point 60, and end 46b of lever arm 46 is pivotally interconnected to lever arm 48 at pivot point 62. Pivot point 60 is located above and rearwardly of axle 34 of vehicle 10. Pivot point 62 is generally disposed below passenger section 20 of vehicle 10.

Lever arm 46 includes a bottom flange 66 which allows lever arm 44 to only rotate about pivot point 60 in the direction of arrow 68. Similarly, bottom flange 66 of lever arm 46 allows lever arm 48 to only rotate in the direction of arrow 70 about pivot point 62. As can be seen from FIG. 1b, the directions of rotations of lever arms 44 and 48 are opposite each other.

Referring simultaneously to FIGS. 2-5, the various positions of vehicle 10 and lever arms 44, 46 and 48 during a collision utilizing the present safety system 12 are illustrated. When a collision occurs between vehicles or a vehicle and a stationary object, the front portion 22 of vehicle 10 tears away from the passenger section 20 of vehicle 10. Front portion 22 moves independent of passenger section 20 and the remaining portion of vehicle 10 such that front portion 22 rotates under passenger section 20 while passenger section 20 moves over front portion 22 as finally illustrated in FIG. 5. Rotation of lever arm 44 about pivot point 60 initially causes front portion 22 to rotate in the direction of arrow 60 as illustrated in FIG. 2a. Body 14 shears in the area of fire wall 24 due to the rotation of lever arm 44 about pivot point 60.

Figure 3A:
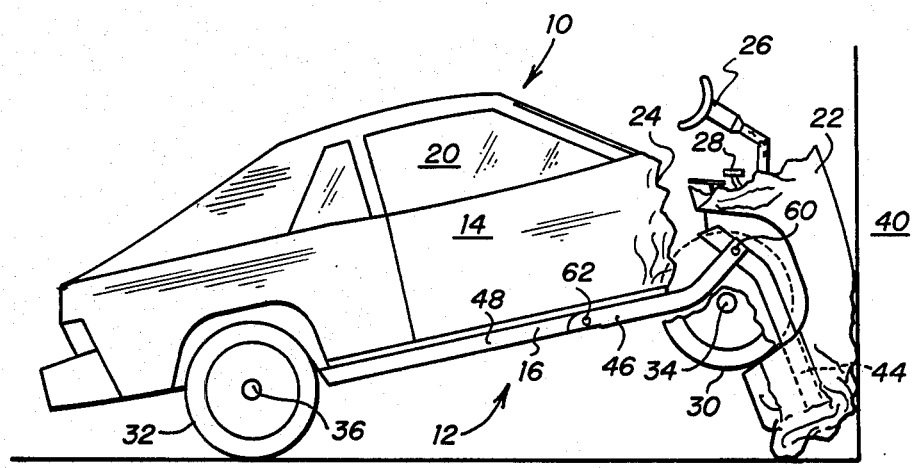
Figure 3B:
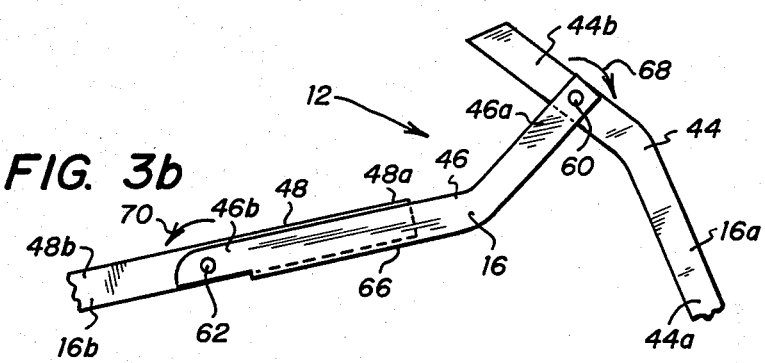

As shown in FIG. 3a, steering wheel 26 and pedal 28 have been extracted through fire wall 24 by the continued rotation of front portion 22, and front portion 22 has been completely severed from the remaining portion of vehicle 10. At this point in the collision, no rotation of lever arm 48 with respect to lever arm 46 about pivot point 62 has begun.

Figure 4A:
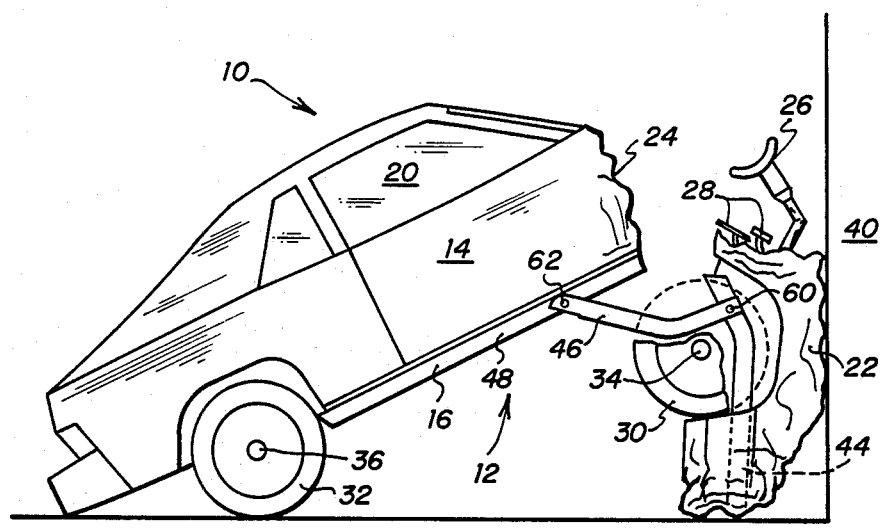
Figure 4B:
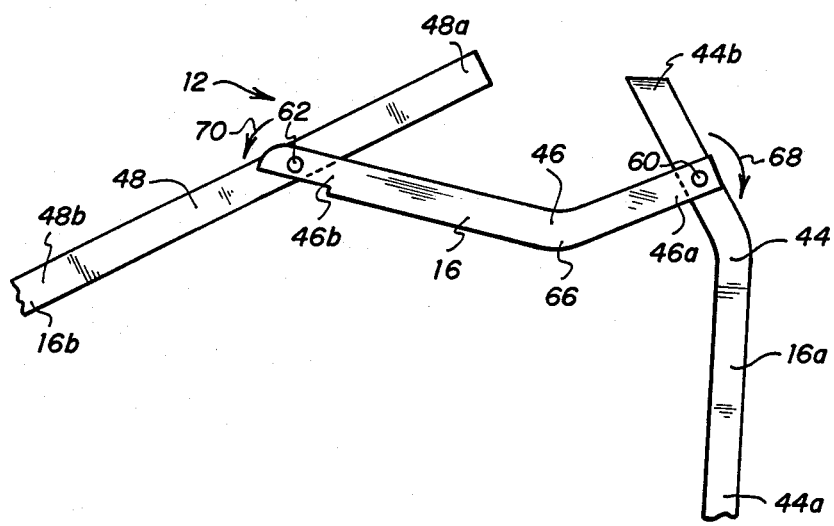
Figure 5A:
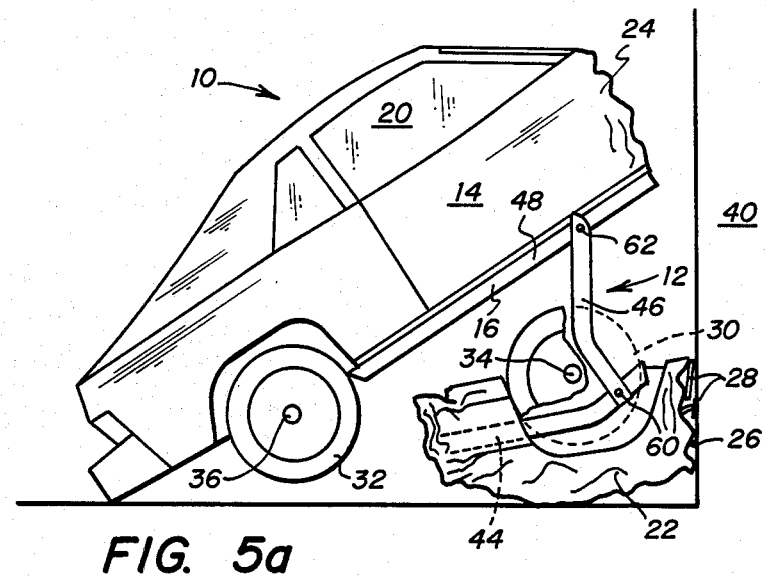
Figure 5B:
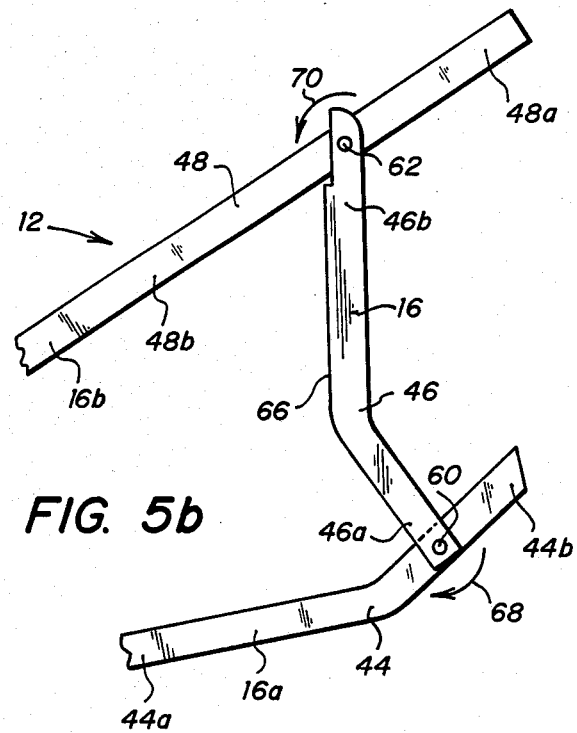

FIG. 4 illustrates the rotation of lever arm 48 about pivot point 62 in the direction of arrow 70 to cause passenger section 20 to begin movement above front portion 22. Rotation about pivot points 60 and 62 continue such that as shown in FIG. 5a, passenger section 20 is completely disposed above front portion 22. Passenger section 20 is located a distance above front portion 22 dictated by the length of lever arm 46.

As illustrated in FIGS. 2-5, the linear impact force created by the collision between vehicle 10 and wall 40 has caused front portion 22 to rotate in the direction of wall 40 whereas passenger section 20 is rotated in the opposite direction. A portion of the linear deceleration motion of vehicle 10 has been translated into rotational movement of passenger section 20 thereby providing additional time and distance for the movement of passengers within passenger section 20 to stop. The forces on passengers within passenger section 20 is in the downward direction into the seats of vehicle 10 rather than forward to urge the passengers against the front of passenger section 20 which would typically occur in a head-on collision. Additionally, the protruding steer wheel 26 and pedals 28 have been removed from passenger section 20 to avoid contact with passengers during impact.

The upward movement of passenger section 20 caused by rotation of lever arm 48 about pivot point 62 translates a portion of the linear deceleration motion of vehicle 10 into tangential rotational movement of passenger section 20 which increases the distance and time of deceleration of the passengers within passenger section 20 to thereby minimize contact and injury to the passengers. Passenger section 20 is thereby effectively withdrawn from the linear impact forces experienced by vehicle 10 upon collision with wall 40. The mass of front portion 20 including the motor and other components of vehicle 10 are utilized to absorb the energy of the impact as these components are crushed and rotated under passenger section 20. Additional forces are required to shear front portion 22 from vehicle 10 in the area of fire wall 24 which further increases the time before passengers within passenger section 20 experience impact forces. Shear bolts of appropriate design may be utilized for stabilizing lever arms 44, 46, and 48, and for interconnecting front portion 22 to vehicle 10 to more easily allow front portion 22 to tear from vehicle 10 in the area of fire wall 24.

Although only one side of vehicle 10 has been illustrated in FIGS. 1-5, it is understood that a similar chassis 16 is disposed on the opposite side of vehicle 10 including lever arms 44, 46 and 48 on the opposite side of vehicle 10. Lever arms 44, 46 and 48 may be installed on conventional vehicles by modifying the existing chassis to insert lever arm 46 and the pivot points 60 and 62. The existing chassis becomes lever arms 44 and 48.

It therefore can be seen that the present safety system increases the time in which deceleration occurs in a vehicle collision and causes movement of passengers within the vehicle out of the line of linear impact forces created by the collision. A portion of the linear deceleration motion of the vehicle is translated into rotational movement of the passenger section to thereby minimize forces experienced by the passengers during a collision.

Whereas the present invention has been described with respect to specific embodiments thereof, it will be understood that various changes and modifications will be suggested to one skilled in the art and it is intended to encompass such changes and modifications as fall within the scope of the appended claims.

I claim:

1. A safety vehicle for passengers comprising:
 a chassis having a front and rear portion;
 a vehicle body disposed on said chassis and having a passenger section disposed intermediate said front and rear portions of said chassis, said vehicle body further having a front section disposed on said front portion of said chassis and secured to the passenger section;
 said chassis including a first lever arm having first and second ends disposed adjacent said front portion thereof;
 said chassis including a second lever arm having first and second ends disposed adjacent said passenger section; and
 said chassis further including a third lever arm having first and second ends and being pivotally interconnected to said first and second lever arms, such that said first end of said third lever arm is pivotally connected adjacent to said second end of said first lever arm at a first pivot point and said second end of said third lever arm is pivotally connected adjacent to said first end of said second lever arm at a second pivot point, a collision with said vehicle body causing said chassis front portion to rotate about said first pivot point in a first direction of rotation and said chassis rear portion to rotate about said second pivot point in a second direction of rotation opposite to the first direction of rotation of said chassis front portion to separate the front section from the passenger section to absorb energy remove said passenger section from the linear impact forces created by the collision and translate a portion of the linear deceleration motion of the vehicle into rotational movement of said passenger section.

2. The safety vehicle of claim 1 wherein said first pivot point is disposed above and to the rear of the front axle of the vehicle.

3. The safety vehicle of claim 2 wherein said second pivot point is disposed below said passenger section.

4. The safety vehicle of claim 1 wherein said third lever arm includes means for preventing rotation of said first lever arm in said second direction of rotation and means for preventing rotation of said second lever arm in said first direction of rotation.

5. A safety vehicle for passengers comprising:
 a chassis having a front and rear portion, the front portion for mounting the front wheels for rotation about a front axle and the rear portion for mounting the rear wheels for rotation about a rear axle;
 a vehicle body disposed on said chassis and having a passenger section and a front section, the passenger section and front section being secured together through a firewall;
 said chassis including a first lever arm having first and second ends supporting the front section;
 said chassis including a second lever arm having first and second ends supporting said passenger section; and
 said chassis further including a third level arm having first and second ends and being pivotally interconnected to the first and second lever arms such that said first end of said third lever arm is pivotally connected adjacent to said second end of said first lever arm at a first pivot point behind and above the front axle and said second end of said third lever arm is pivotally connected adjacent to said first end of said second lever arm at a second pivot point, the impact of a collision causing said first lever arm to rotate about said first pivot point in a first direction of rotation toward the ground to separate the front section from the passenger section at the firewall and absorb impact energy by the separation, said chassis rear portion rotating about said second pivot point in a second direction of rotation opposite to the first direction of rotation of said first lever arm to lift the passenger section over the front section and absorb collision energy by lifting the passenger section upward against gravity and crushing and rotating the front section underneath the passenger section and further to remove said passenger section from the linear impact forces created by the collision and translating a portion of the linear deceleration motion of the vehicle into the rotational movement.

6. The safety vehicle of claim 5 wherein the safety vehicle has a steering wheel and operating pedals extending through the firewall from the front section, pivotal motion of the first lever arm about the first pivot point to separate the front section from the passenger section causing the steering wheel and operating pedals to be drawn from the passenger section through the firewall to prevent passenger impact thereon.

7. The safety vehicle of claim 5 wherein the front section is secured to the passenger section by shear elements, said shear elements shearing as the front section separates from the passenger section.

8. A safety improvement for a passenger vehicle, the passenger vehicle having a passenger section and a front section attached to the passenger section, the passenger vehicle further having a chassis for supporting the passenger and front sections and front and rear axles, the chassis having a first horizontal portion extending from beneath the passenger section to the rear of the vehicle, an inclined portion extending upwardly and forwardly from the front end of the horizontal portion and a second, generally horizontal portion extending from the front of the inclined portion to the front of the vehicle, the improvement comprising:
 means for pivotally mounting the second horizontal portion to the inclined portion at a first pivot point behind the front axle and within the front section; and
 means for pivotally mounting the inclined portion to the first horizontal portion about a second pivot point underneath the passenger section, the second horizontal portion pivoting about the first pivot point in a first direction of rotation relative to the inclined portion and causing the front section to separate from the passenger section to absorb energy in a collision, the inclined portion subsequently pivoting about the second pivot point in an opposite direction of rotation relative the first horizontal portion to lift the passenger section above the front section and absorb collision energy by lifting the passenger section and crushing the front section underneath.

* * * * *